United States Patent [19]

Hoffacker

[11] Patent Number: 5,791,730
[45] Date of Patent: Aug. 11, 1998

[54] BICYCLE SEAT

[75] Inventor: Bernhard J. Hoffacker, Woodside, Calif.

[73] Assignee: Avocet, Inc., Newark, Calif.

[21] Appl. No.: 700,321

[22] Filed: Aug. 9, 1996

[51] Int. Cl.$^6$ ................................ B60N 2/40; B62J 1/00
[52] U.S. Cl. .................. 297/195.1; 297/202; 297/214; 297/215.16; D6/354
[58] Field of Search ................. 297/195.1, 202, 297/215.16, 214; D6/354

[56] References Cited

U.S. PATENT DOCUMENTS

| D. 214,478 | 6/1969 | Kitaguch | D6/354 |
|---|---|---|---|
| 2,801,199 | 7/1957 | Meyers | 297/214 X |
| 3,756,653 | 9/1973 | Worley | 297/214 X |
| 3,758,154 | 9/1973 | Kitaguchi | 297/214 |
| 4,026,600 | 5/1977 | Kutaguchi | 297/214 |
| 4,103,966 | 8/1978 | Allen | 297/195.1 |
| 4,204,713 | 5/1980 | Worley | 297/214 |
| 4,218,090 | 8/1980 | Hoffacker et al. | 297/202 X |
| 4,768,826 | 9/1988 | Kashima | 297/195.1 |
| 4,909,522 | 3/1990 | Flanigan | 297/214 X |
| 5,165,752 | 11/1992 | Terry | 297/202 X |
| 5,348,369 | 9/1994 | Yu | 297/195.1 X |
| 5,356,198 | 10/1994 | Hughes | 297/195.1 |
| 5,388,887 | 2/1995 | Read | 297/195.1 |
| 5,544,936 | 8/1996 | Bigolin | 297/195.1 |

Primary Examiner—Peter M. Cuomo
Assistant Examiner—Rodney B. White
Attorney, Agent, or Firm—Limbach & Limbach L.L.P.

[57] ABSTRACT

An improved bicycle seat is disclosed which is especially advantageous for mountain bike riding. When descending, a cyclist may improve the handling of the bicycle by changing his position relative to the bicycle. A rearmost portion of the inventive seat is provided with a generally planar ramped surface that extends rearward to the trailing edge to allow the rider to shift his weight to the back of the seat and lower his center of gravity. The rider may move further back completely off of the seat and lower his position below the level of the seat. Tapered edges are provided along the sides to allow for easy entry back onto the seat from the ramped surface or from behind and beneath the seat. The ramped surface and tapered edges also allow the rider to contact the seat comfortably when not fully seated on it to better control the bicycle.

26 Claims, 3 Drawing Sheets

BICYCLE SEAT

BACKGROUND OF THE INVENTION

1. Field of the Invention

The present invention relates to bicycle seats, and in particular to a seat that allows a bicycle rider to position himself on the back of the seat and control the bicycle from that position, and to move completely off of the back of the seat and easily move back onto the seat from a position rearward of the seat, such as when riding a mountain bike downhill.

2. Discussion of the Prior Art

For many years there has been a variety of saddles or seats available to cyclists. However, most prior art seats have conformed to the same general shape. This fairly standard shape includes a narrow front region or nose, and a wider rear region. The front region resides between the cyclist's legs and serves primarily to keep the rider centered on the seat without interfering with the pedaling action of his or her legs. The rear region resides under the pelvic bones of the cyclist, and serves primarily to support the weight of the rider.

Prior art seats employ various construction styles. Some seats are constructed with a flexible or rigid shell, often made from plastic, covered with padding and a leather or synthetic fabric cover. Other seats include only a plastic or leather shell with no covering.

As the use of mountain or all-terrain bicycles has become popular in recent years, the use of the standard bicycle seats has been adopted with little or no modification. The few modifications that have been made do not depart significantly from the traditional seat shape and design.

When riding a mountain bike, especially when descending a grade or whenever the bike is forwardly inclined, it is desirable for the rider to move his or her center of gravity rearward to maintain proper balance and to keep the weight suitably distributed between the wheels. This often necessitates that the rider shift his weight off of the seat and onto the bicycle pedals to allow him to move to the very back of the seat, or completely off of the rear of the seat. Experienced riders will often shift their center of gravity even further by moving off of the back of the seat and lowering their buttocks below the level of the seat.

With prior art seats, shifting weight to the back of the seat is difficult because the generally horizontal upper surface of the seat has a sharply radiused trailing edge that ends abruptly. There is no transition area between being fully on and fully off of the seat. Furthermore, moving off of the back of the seat and then back onto the seat from a rearward position can be difficult. Delay or inconsistency in shifting body weight rearward or off of the back of the seat, and then forward or back onto the seat, causes the rider to have less control over the bicycle.

What is needed, and is lacking in the prior art, is a bicycle seat that allows a rider to position at least some of his weight on the back of the seat and facilitates easy and consistent movement onto the seat from the rear with a high level of comfort.

SUMMARY OF THE INVENTION

In accordance with one aspect of the present invention, a bicycle seat is provided with a generally planar ramped surface extending upward from the center of the trailing edge of the seat toward the middle of the rear region of the seat to provide an area on which the rider can support at least some of his weight on the rearmost portion of the seat. The rider can comfortably sit on this surface with his lower pelvic region, or press his upper pelvic or lower abdominal region against this surface when positioned off of the back of the seat. The shape of this back portion of the seat mirrors the contour of the rider and provides a larger area of contact for when the rider is "floating" over the seat and encounters bumps, thereby increasing comfort.

In accordance with another aspect of the present invention, a bicycle seat is provided with a pair of tapered side edges on the outside rear of the seat that narrow towards the rear of the seat to assist in guiding a bicycle rider onto the seat from a position rearward of the seat.

In accordance with yet another aspect of the present invention, the tapered side edges of the seat are proportioned to allow a cyclist to control the lateral movement of the bicycle by pressing the inside of one or both thighs against the tapered side edges while his weight is on the back of or off of the seat.

Further objects and features will become apparent by a review of the specification, claims and appended figures.

DETAILED DESCRIPTION OF THE PREFERRED EMBODIMENT

Figure 1:
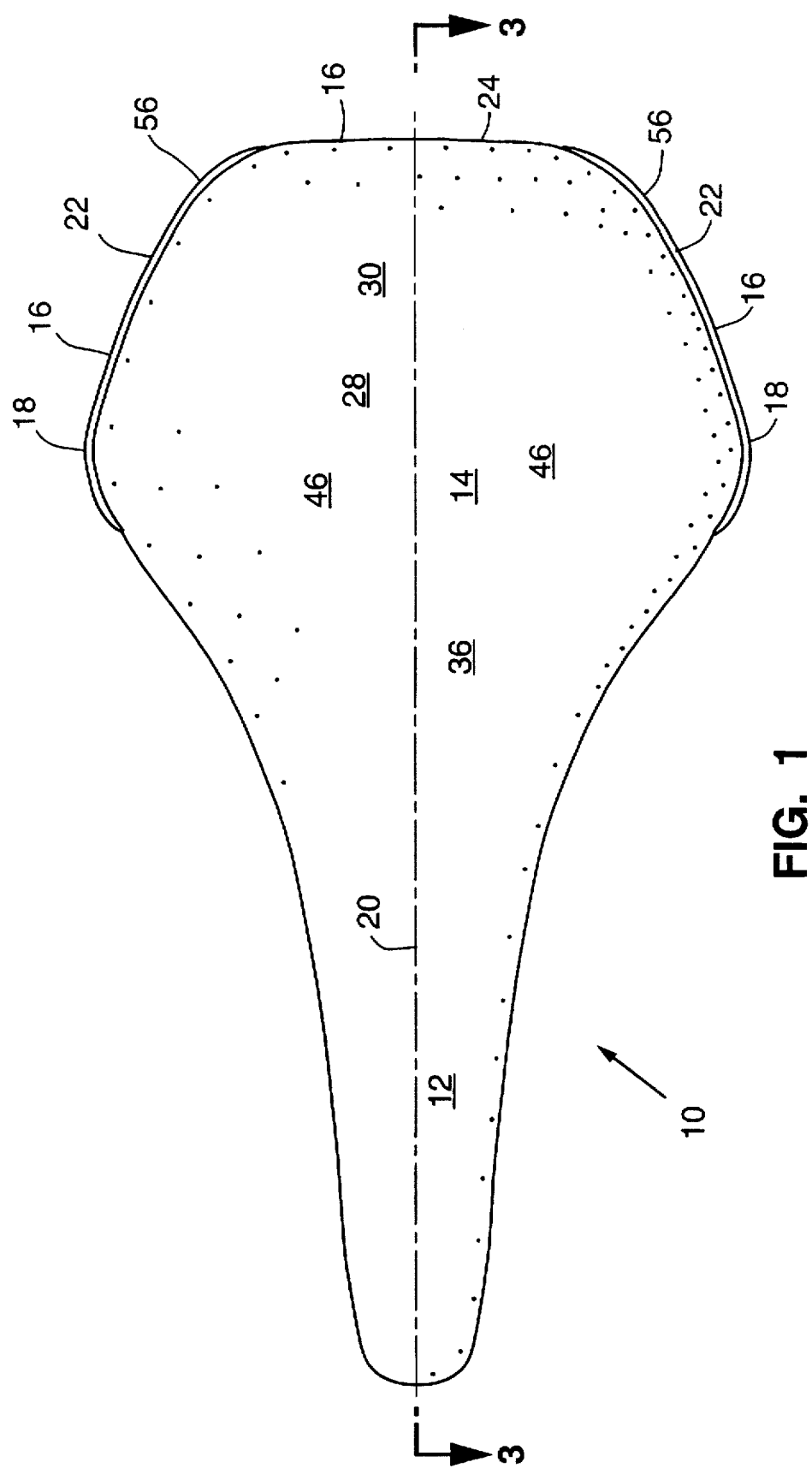
FIG. 1 is a top plan view of a cycle seat constructed according to the invention.

Referring to FIG. 1, the preferred embodiment of the inventive seat is shown, generally referred to with the reference numeral 10. Seat 10 has a narrow leading edge region 12, and a wider rear region 14. The rear region 14 has a trailing edge 16, and a maximum width 18 forward thereof. Seat 10 is preferably symmetrical about a longitudinal centerline 20.

Prior art seats (not shown) generally have an arcuate trailing edge that has a constant radius or is otherwise smoothly contoured. In contrast, seat 10 has a segmented trailing edge 16, i.e. a trailing edge that is a noncontinuous arcuate edge having separate segments that do not transition seamlessly together. As shown in FIG. 1, segmented trailing edge 16 of the preferred embodiment has a pair of tapered edge segments 22 separated by a flattened rear segment 24. Tapered edge segments 22 angle forward and outward from flattened rear segment 24 to the maximum width 18. Tapered edge segments 22 assist in guiding a bicycle rider onto seat 10 from a position lower than the top surface of seat 10 and/or rearward of seat 10. This is accomplished by contacting the inner thigh portion of the rider's legs and guiding the legs outward around the maximum width 18 of seat 10 as the rider moves forward back onto seat 10.

Tapered edge segments 22 can also be used by a cyclist to control the lateral movement of the cycle. When the cyclist has moved off of the back of seat 10, his only contact points can be his hands on the handlebars and his feet on the pedals. As such, considerable lateral movement between the rider and the bicycle is possible. Tapered edge segments 22 provide a flat surface against which the rider can press his upper leg or legs to stabilize himself and the cycle, such as during cornering. Seat 10 can be comfortably pressed between the rider's thighs because tapered segments 22 provide large areas of contact with the rider's legs, as opposed to the point contact provided by the corners of prior art seats.

Figure 2:
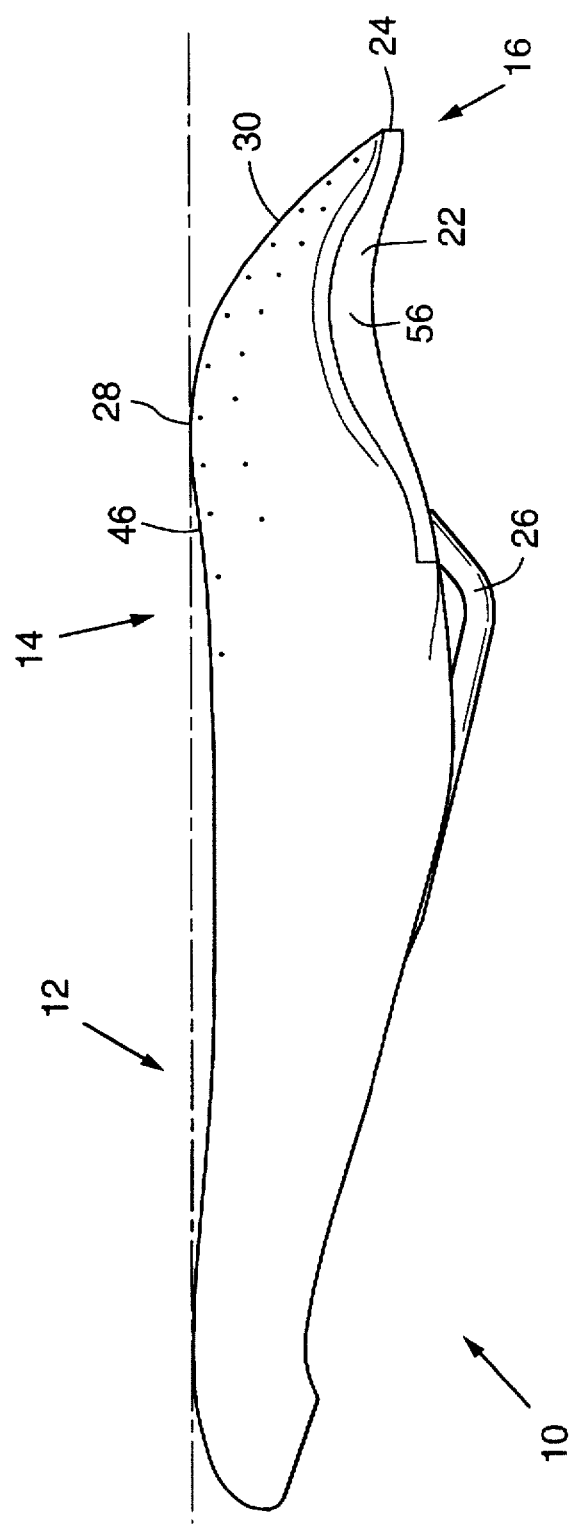
FIG. 2 is a side elevational view of a cycle seat constructed according to the invention.

Referring to FIG. 2. a side elevational view of seat 10 is shown. Although mounting rails 26 are attached to a means (not shown) for adjusting the forward angle of inclination when mounted on a bicycle, seat 10 is typically used in a generally horizontal orientation as shown, with a maximum height portion 28 on rear region 14 positioned level with a maximum height portion on leading edge region 12.

Rear region 14 is provided with a generally planar ramped surface 30 spanning between maximum height portion 28 and flattened rear segment 24. Ramped surface 30 provides a large surface area on which the rider can sit to shift his weight rearward.

Ramped surface 30 can also be used by the rider to help control the bike or balance some of the rider's weight. In a similar fashion to that described above for tapered edge segments 22, or in conjunction therewith, a rider may contact ramped surface 30 with his lower pelvic region by moving to the very back of seat 10. Alternatively, the rider may move off of seat 10 and contact ramped surface 30 with his upper pelvic or lower abdominal regions. This type of transition position is not generally possible with prior art seats due to the sharply radiused trailing edges. If the rider is "floating" above the seat and encounters bumpy terrain, the large surface area of ramped surface 30 provides greater comfort when contacting the rider.

Ramped surface 30 can also assist in guiding a bicycle rider onto seat 10 from a position lower than and rearward from maximum height portion 28. This is accomplished by contacting the bottom of the rider's pelvic region and guiding the same upward and over the maximum height portion 28 of the rear of seat 10 as the rider moves forward back onto seat 10.

Figure 3:
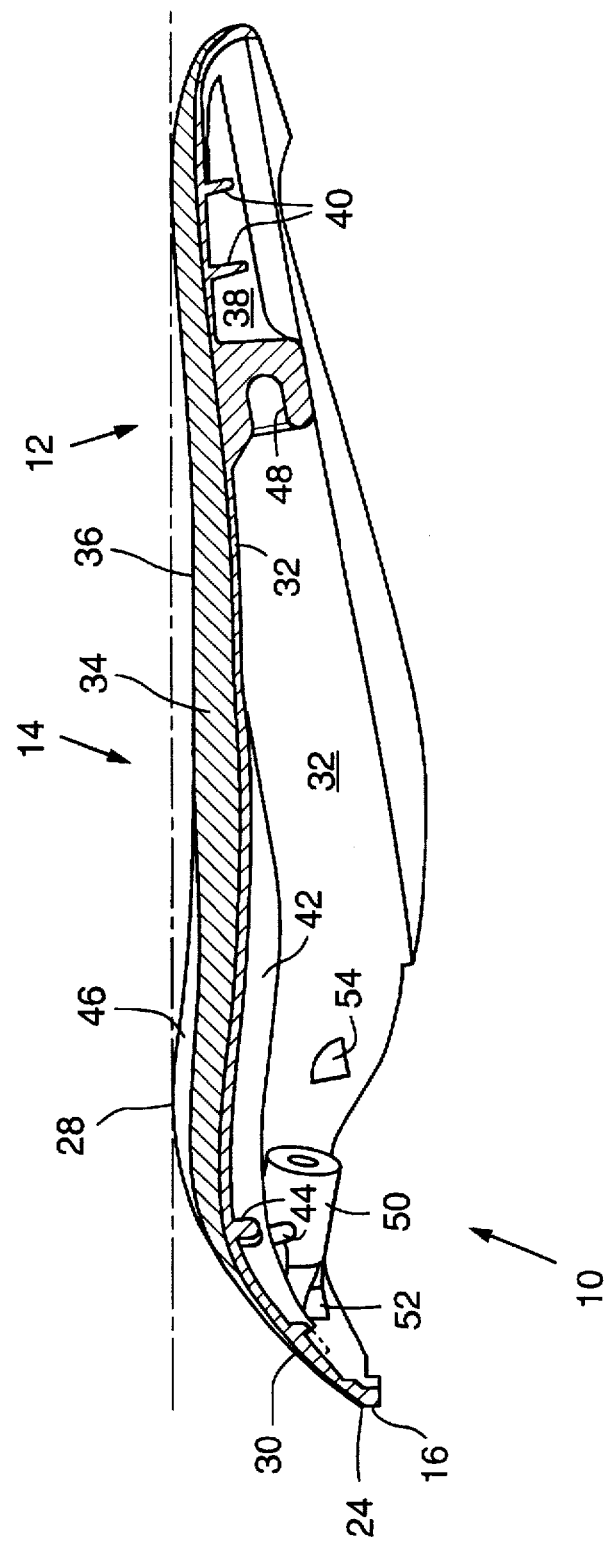
FIG. 3 is a cross-sectional view along line 3—3 in FIG. 1.

Referring to FIG. 3, the preferred construction of the inventive seat is shown. A thin flexible shell 32, preferably made of injection molded plastic, forms the base of seat 10. Padding 34, such as of polyurethane foam and/or gel, is formed on shell 32 or attached with adhesive, as is well known in the art. A cover 36, such as of leather, nylon, PVC, or other suitable material known in the art, may be stretched over padding 34 and glued to the underside of shell 32. Padding 34 and/or cover 36 can be omitted if desired, and seat 10 can support the rider directly with shell 32.

Front longitudinal ribs 38 and front transverse ribs 40 are formed in shell 32 to stiffen leading edge region 12. Rear longitudinal ribs 42 and rear transverse rib 44 provide sufficient rigidity to properly support a rider. The regions of shell 32 directly under the rider's pelvic bones are without stiffening ribs, and preferably have a thinned cross-section to allow shell 32 to flex in these areas. Thickened sections 46 in padding 34 are provided over these shell regions to provide a more comfortable seat, as fully described in U.S. Pat. No. 4,218,090 issued to Hoffacker et al. on Aug. 19, 1980, incorporated herein by reference.

A slotted receptacle 48 and two bosses 50 are formed in shell 32 to engage steel mounting rails 26 (partially shown in FIG. 2.) Mounting rails 26 are adjustably mounted to a seat post (not shown) for securing seat 10 to the frame of a bicycle. Preferably, receptacle 48 and bosses 50 are spaced apart as shown to suspend the majority of shell 32 therebetween. This allows shell 32 to flex in order to more comfortably conform to the rider.

Mounting posts 52 and 54 are provided to receive threaded fasteners (not shown) for securing plastic bumpers 56 (best shown in FIG. 1) to shell 32. Bumpers 56 are positioned along tapered edge segments 22 to help protect seat 10 from damage, such as when a bicycle is laid over on its side.

Referring to FIGS. 1–3, further details of the preferred embodiment will be described. Preferably, tapered edge segments 22 form an angle of approximately 20 degrees with the longitudinal centerline 20 when viewed from above as in FIG. 1. Although tapered edge segments 22 appear slightly curved in FIG. 1, they each lie in a single plane which undercuts seat 10 and is approximately 20 degrees from vertical. In other words, tapered edge segments 22 appear flat when viewed from a compound angle approximately 20 degrees from the side toward the rear and approximately 20 from the top toward the side.

Preferably, ramped surface 30 generally forms a 40 degree angle from horizontal. The use of padding 34, if desired, slightly increases the angle of ramped surface 30 as compared to the angle of the bare shell 32. The pitch of ramped surface 30 approximates the direction a rider moves on and off seat 10 when re-positioning his center of gravity, and also the contour of the rider when positioned on the rear of the seat. The length along ramped surface 30 from maximum height 28 to the flattened rear segment 24 of trailing edge 16 is preferably 2.5 inches.

Preferably, seat 10 is approximately 11.25 inches long and has a maximum width of 6.8 inches.

The angles and degree of curvature of tapered edge segments 22 and ramped surface 30 can be changed as long as they still allow the rider to shift his weight rearward and guide the rider comfortably back on the seat from the rear. Ramped surface 30 can be used without tapered edge segments 22, but best results are obtained when tapered edge segments 22 and ramped surface 30 are used in conjunction. It is envisioned that flattened rear segment 24 can be rounded or shortened by making tapered edge segments 22 longer or more sharply angled, but doing so may adversely affect the benefits provided by ramped surface 30.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims and their equivalents.

What is claimed as the invention is:

1. A bicycle seat comprising:

a narrow leading edge region and a wider rear region, each region having a maximum height that together define a horizontal plane, the rear region having a trailing edge that includes a central portion located below the horizontal plane, the rear region having a slightly curved, substantially planar ramped surface spanning continuously between the central portion of the trailing edge and the horizontal plane, the ramped surface having an inclined length from the central portion of the trailing edge to the maximum height of the rear region, the ramped surface having an angle of inclination which is defined by the horizontal plane and a tangent to the ramped surface taken at a point half way along the inclined length, the ramped surface having a combination of a sufficiently long inclined length and a sufficiently low angle of inclination for supporting at least a portion of a rider's weight in a rearward position and for guiding the rider onto the seat from a position rearward thereof.

2. A bicycle seat as recited in claim 1 wherein the central portion of the trailing edge is substantially horizontal and perpendicular to a longitudinal axis of the seat and is coplanar with the ramped surface.

3. A bicycle seat as recited in claim 1 wherein the ramped surface has a horizontal width generally equal to one half of a maximum horizontal width of the seat.

4. A bicycle seat as recited in claim 1 wherein the angle of inclination of the ramped surface is between 10 and 70 degrees below the horizontal plane.

5. A bicycle seat as recited in claim 4 wherein the angle of inclination is generally 40 degrees.

6. A bicycle seat as recited in claim 1 wherein the seat has an overall length, the ramped surface having a radius of curvature at least one quarter of the overall seat length.

7. A bicycle seat as recited in claim 1 wherein the ramped surface has lateral edges that project outward as they extend upward and forward.

8. A bicycle seat as recited in claim 1 wherein the ramped surface has a top edge substantially coincident with the maximum height of the rear region, the central portion of the trailing edge being located approximately 1.5 inches behind and 1.25 inches below the top edge.

9. A bicycle seat as recited in claim 1 wherein the inclined length of the ramped surface is at least 1.5 inches.

10. A bicycle seat as recited in claim 9 wherein the inclined length of the ramped surface is approximately 2.5 inches.

11. An improved bicycle seat of the type having a narrow leading edge region and a wider rear region with a trailing edge, each region having a maximum height that together define a horizontal plane, the trailing edge having a central portion located below the horizontal plane, the improvement comprising:

a slightly curved, substantially planar ramped surface spanning between the central portion of the trailing edge and the horizontal plane, the ramped surface having an inclined length from the central portion of the trailing edge to the maximum height of the rear region, the ramped surface having an angle of inclination which is defined by the horizontal plane and a tangent to the ramped surface taken at a point half way along the inclined length, the ramped surface having a combination of a sufficiently long inclined length and a sufficiently low angle of inclination for supporting at least a portion of a rider's weight in a rearward position; and two tapered segments located on the trailing edge on opposite sides of the ramped surface, the tapered segments angling outward as they extend forward, the ramped surface and the tapered segments cooperating to allow a bicycle rider to better control the bicycle by contacting the ramped surface and the tapered segments and to assist in guiding the rider onto the seat from a position rearward of the seat.

12. A bicycle seat as recited in claim 11 further comprising a generally flattened segment located between the two tapered segments, the flattened segment being centered on and generally perpendicular to a longitudinal centerline of the seat.

13. A bicycle seat as recited in claim 12 wherein the generally flattened segment is located rearward of the maximum width a distance at least one quarter of the maximum width.

14. A bicycle seat as recited in claim 13 wherein the distance that the generally flattened segment is located rearward of the maximum width is generally equal to one half of the maximum width.

15. A bicycle seat as recited in claim 12 wherein the generally flattened segment has a length at least one quarter of the maximum width.

16. A bicycle seat as recited in claim 15 wherein the length of the generally flattened segment is generally equal to one half of the maximum width.

17. A bicycle seat as recited in claim 12 wherein the generally flattened segment has a radius greater than the maximum width of the rear region of the seat.

18. A bicycle seat as recited in claim 17 wherein the radius of the generally flattened segment is generally equal to one and a half times the maximum width.

19. A bicycle seat as recited in claim 11 wherein each of the tapered segments has a radius greater than one half of the maximum width of the rear region of the seat when viewed from above.

20. A bicycle seat as recited in claim 11 wherein the radius of each of the tapered segments is generally equal to the maximum width when viewed from above.

21. A bicycle seat as recited in claim 11 wherein each of the two tapered segments has a general orientation to a longitudinal centerline of between 10 and 60 degrees.

22. A bicycle seat as recited in claim 21 wherein the general orientation of each of the two tapered segments is about 20 degrees to the longitudinal centerline.

23. A bicycle seat as recited in claim 11 wherein each of the two tapered segments has a horizontal length that is at least one quarter of the maximum width.

24. A bicycle seat as recited in claim 23 wherein the horizontal length of each of the two tapered segments is generally equal to one half of the maximum width.

25. A bicycle seat as recited in claim 11 wherein the ramped surface is inclined at an angle of 40 degrees below the horizontal plane.

26. A bicycle seat as recited in claim 11 wherein the tapered segments extend farther forward on the seat than the ramped surface.

* * * * *